United States Patent
Jung (10) Patent No.: US 8,570,544 B2
(45) Date of Patent: Oct. 29, 2013

(54) MULTIFUNCTION PERIPHERAL (MFP) AND A METHOD FOR RESTRICTING USE THEREOF

(75) Inventor: Jea-wan Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 675 days.

(21) Appl. No.: 11/302,359

(22) Filed: Dec. 14, 2005

(65) Prior Publication Data

US 2006/0126100 A1 Jun. 15, 2006

(30) Foreign Application Priority Data

Dec. 15, 2004 (KR) .................. 10-2004-0105996
Oct. 19, 2005 (KR) .................. 10-2005-0098602

(51) Int. Cl.
*G06K 15/00* (2006.01)
*G06F 3/12* (2006.01)
*H04N 1/60* (2006.01)
*H04N 1/46* (2006.01)
*G03G 15/00* (2006.01)

(52) U.S. Cl.
USPC .......... 358/1.14; 358/1.15; 358/1.9; 358/505; 399/10; 399/11; 399/80; 399/82

(58) Field of Classification Search
USPC ............... 358/1.15, 1.14, 296, 501, 505, 474; 400/62; 713/194, 170, 165, 166, 168, 713/182, 183, 184, 185, 186; 399/80, 81, 399/82, 83, 85, 366, 8, 10, 11, 301, 361, 399/381, 411
See application file for complete search history.

(56) References Cited

U.S. PATENT DOCUMENTS

| 5,982,367 A | 11/1999 | Alimpich et al. |
| 5,999,766 A * | 12/1999 | Hisatomi et al. ............... 399/80 |
| 6,880,091 B1 * | 4/2005 | Mattis et al. .................... 726/5 |
| 7,219,231 B2 * | 5/2007 | Cossel et al. ................. 713/168 |
| 2004/0213612 A1 * | 10/2004 | Hanaoka ........................ 400/62 |
| 2004/0250129 A1 * | 12/2004 | Clough et al. ............... 713/201 |
| 2005/0123316 A1 * | 6/2005 | Hirano ............................ 399/80 |

FOREIGN PATENT DOCUMENTS

| CN | 1438586 A | 8/2003 |
| JP | 10-116003 | 5/1998 |
| KR | 1996-0024723 | 7/1996 |
| KR | 1997-066830 | 10/1997 |
| KR | 2003-0061500 | 7/2003 |
| KR | 2003-0079817 | 10/2003 |

* cited by examiner

*Primary Examiner* — Ngon Nguyen
(74) *Attorney, Agent, or Firm* — Roylance, Abrams, Berdo & Goodman, L.L.P.

(57) ABSTRACT

A multifunction peripheral (MFP) and a method for restricting the use of the same. A user ID and a password are registered according to a user's input, accessible functions are set according to the registered user, and even the authenticated user is restricted to using only the set functions. Therefore, use of the MFP and specific functions of the MFP can be restricted according to the particular registered user.

15 Claims, 7 Drawing Sheets

MFP USER REGISTRATION PROGRAM

USER REGISTRATION

ID​ KIM SAMSUNG

PASSWORD ****

PERMITTED FUNCTIONS
- ☑ Print
- ☑ Scan
- ☑ FAX
- ☑ Copy
- ☑ Scan to E-mail

REGISTER​ CANCEL

MULTIFUNCTION PERIPHERAL (MFP) AND A METHOD FOR RESTRICTING USE THEREOF

CROSS-REFERENCE TO RELATED APPLICATION

This application claims the benefit under 35 U.S.C. §119 (a) of Korean Patent Applications Serial No. 2004-105996, filed Dec. 15, 2004 and Serial No. 2005-98602, filed Oct. 19, 2005, the entire contents of both of which are hereby incorporated by reference.

BACKGROUND OF THE INVENTION

1. Field of the Invention

The present invention relates to a multifunction peripheral (MFP). More particularly, the present invention relates to a method for restricting the use of a multifunction peripheral (MFP) to a registered user.

2. Description of the Related Art

A conventional multifunction peripheral (MFP) such as a printer, scanner or facsimile machine is not only able to serve as a mere office machine but can also receive e-mails and access Internet websites when the MFP is equipped with a multimedia function. The MFP comprises a communication device 30 so as to connect to external networks such as the Internet and utilize related functions by driving the appropriate application programs, for example, a web browser program or an e-mail program. Additionally, the e-mail contents and information on the websites can be printed out using the printer function of the MFP. As is well known in the art, a computer program can be defined as a set of instructions (program codes) in a logical sequence interpreted and executed by a computer enabling the computer to perform a required function or instruction.

Figure 1:
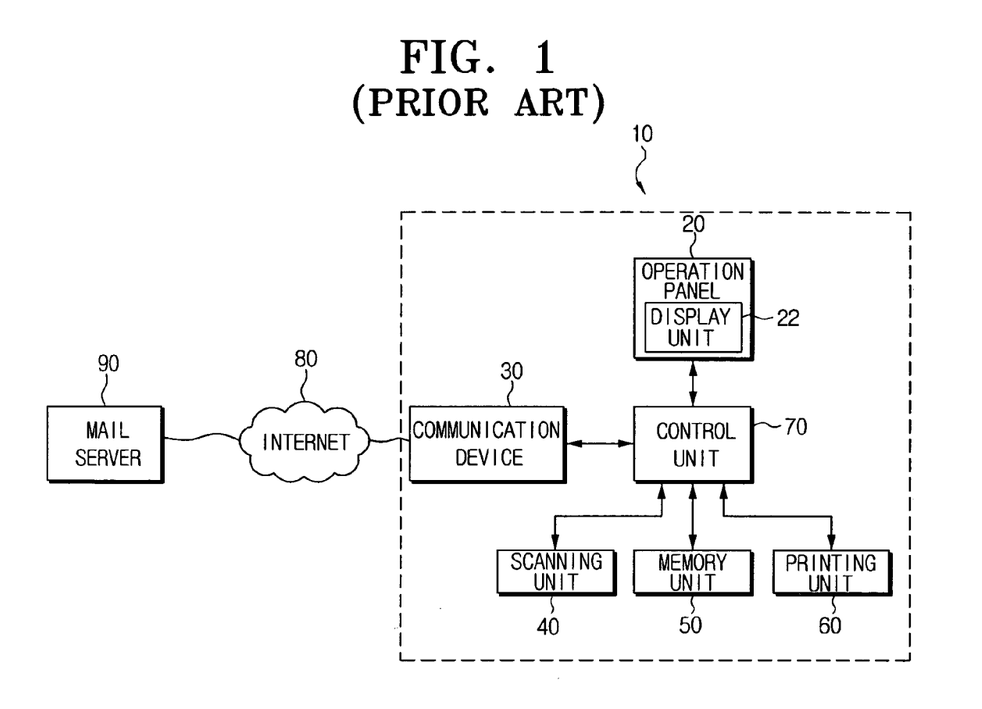
FIG. 1 is a block diagram of a conventional multifunction peripheral (MFP)

FIG. 1 shows a conventional MFP. As shown in FIG. 1, an MFP 10 comprises a computer application enabling e-mail functions with a mail server 90 through a network, such as the Internet 80. The MFP 10 comprises a memory unit 50 comprising storage mediums such as hard disc drive (HDD) to record therein user information, a directory of e-mail addresses, Internet websites and phone numbers, and files for storing print jobs for printing. The various functions of the MFP can be set for use by a particular user by manipulating an operation panel 20 through a display unit 22.

More specifically, the MFP 10 comprises the operation panel 20, the display unit 22, the memory unit 50 and a control unit 70. The operation panel 20 serves as an input means for inputting addresses using a uniform resource locator (URL) of the Internet websites: and setting assorted functions. The display unit 22 shows the functions selected through the operation panel 20 and the working state of the MFP. The memory unit 50 stores information regarding the input signals of the operation panel 20, general printing work files and scanned data. The memory unit 50 also stores information of a user and a manager of the apparatus and the directory of e-mail addresses, Internet websites and phone numbers. The control unit 70 connects with the Internet 80 through a communication device 30 and reads out a web document from websites to output the document to a printing unit 60. Also, the control unit 70 may perform a scan-to-e-mail function to transmit data scanned by a scan unit 40 to a certain site via e-mail.

The communication device 30 transmits the web document to the mail server 90 using an e-mail address transmitted from the control unit 70 through the Internet 80. Such a communication device 30 may comprise a network interface card such as a modem or a local area network (LAN) card, capable of transmitting e-mails and processing signals.

Since the conventional MFPs are used in an office, being interconnected by networks, any user on the same network can access the conventional networked MFP without restriction. In other words, there has not been any restriction to only a few approved users in using a certain networked MFP, nor has there been a restriction from using the special functions of the networked MFP.

Such unrestricted use of the MFP by an unauthorized user or of unauthorized functions may increase the waste of resources.

SUMMARY OF THE INVENTION

An aspect of the present invention is to solve at least the above problems and/or disadvantages and to provide at least the advantages described below. Accordingly, an aspect of the present invention is to provide a multifunction peripheral (MFP) apparatus capable of separately managing the right to use the apparatus based on the particular users desiring to use the apparatus and specific functions accessible to a particular user, and a method for the same.

In order to achieve the above-described aspects of the present invention, there is provided a method for restricting the use of a multifunction peripheral (MFP) apparatus, wherein only an authenticated user is permitted to use the MFP. Functions of the MFP are restricted according to the authentication of the user requesting to use the MFP.

The functions of the MFP comprise at least one of printing, scanning, copying, facsimileing and e-mailing. The use of the different functions of the MFP is permitted through the authentication of a user ID and a user password.

According to another aspect of the present invention, there is provided a method for restricting the use of the functions of an MFP comprising the steps of registering a user; authenticating the registration of the user; and permitting only an authenticated user in the authenticating step to use the MFP. The method may further comprise the step of restricting even the authenticated user to using the permitted functions in use.

Figure 4:
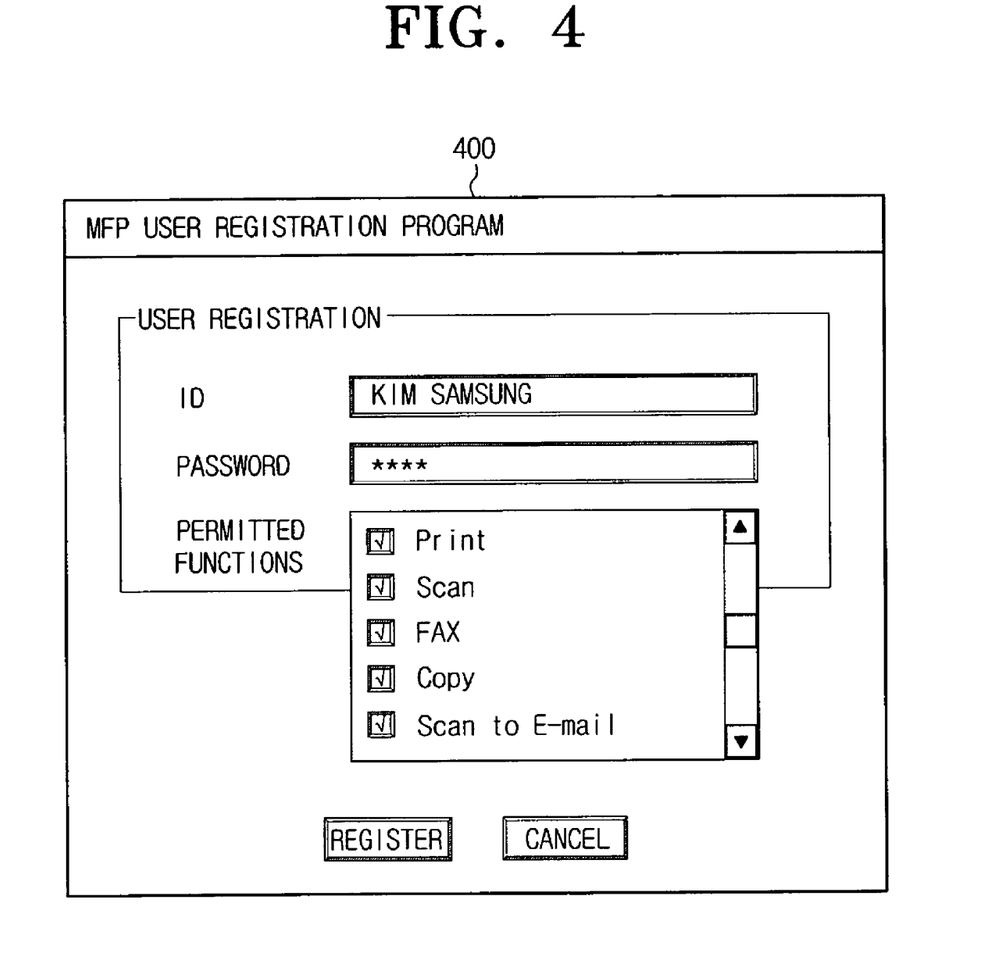
FIG. 4 shows an example of a user registration program for an MFP according to an embodiment of the present invention.

The functions of the MFP comprise at least one of printing, scanning, copying, faxing and e-mailing. Such functions of the MFP may be combined to create other functions, including scan-to-fax and scan-to-e-mail, as illustrated in FIG. 4

The registering step comprises the steps of inputting user identification (ID) and a password according to the user; and setting functions requiring authentication according to the input of a user ID and the password and registering the functions in the MFP. The authenticating step further comprises the steps of displaying a user authentication program for input of the user ID and the password; and authenticating the user when the input user ID and the password correspond to those users registered to use the MFP.

In order to achieve the above aspects of the present invention, there is provided an MFP capable of restricting use thereof according to a user, the MFP comprising a user management unit configured for user registration and user authentication; and a control unit for controlling the functions of the MFP when the user is authenticated through the user management unit.

The user management unit comprises a user registration part for registering a user by a user ID and a password and registering permitted functions according to the registered user; and a user authentication part for displaying a user authentication program for facilitating the input of the user's ID and password.

For the user registration, the permitted functions are set and registered according to the user's ID and password. The control unit controls the MFP so that even the authenticated user is restricted to the permitted functions in use.

BRIEF DESCRIPTION OF THE DRAWING FIGURES

The above aspects and other features of the present invention will become more apparent by describing in detail exemplary embodiments thereof with reference to the attached drawing figures, in which.

It should be understood that throughout the drawings like reference numbers refer to like features, structures and elements.

DETAILED DESCRIPTION OF EXEMPLARY EMBODIMENTS

Hereinafter, certain exemplary embodiments of the present invention will be described in detail with reference to the accompanying drawing figures.

The matters defined in the description such as a detailed construction and elements are provided to assist in a comprehensive understanding of the invention. Descriptions of well-known functions or constructions are omitted for the sake of clarity and conciseness.

Figure 2:
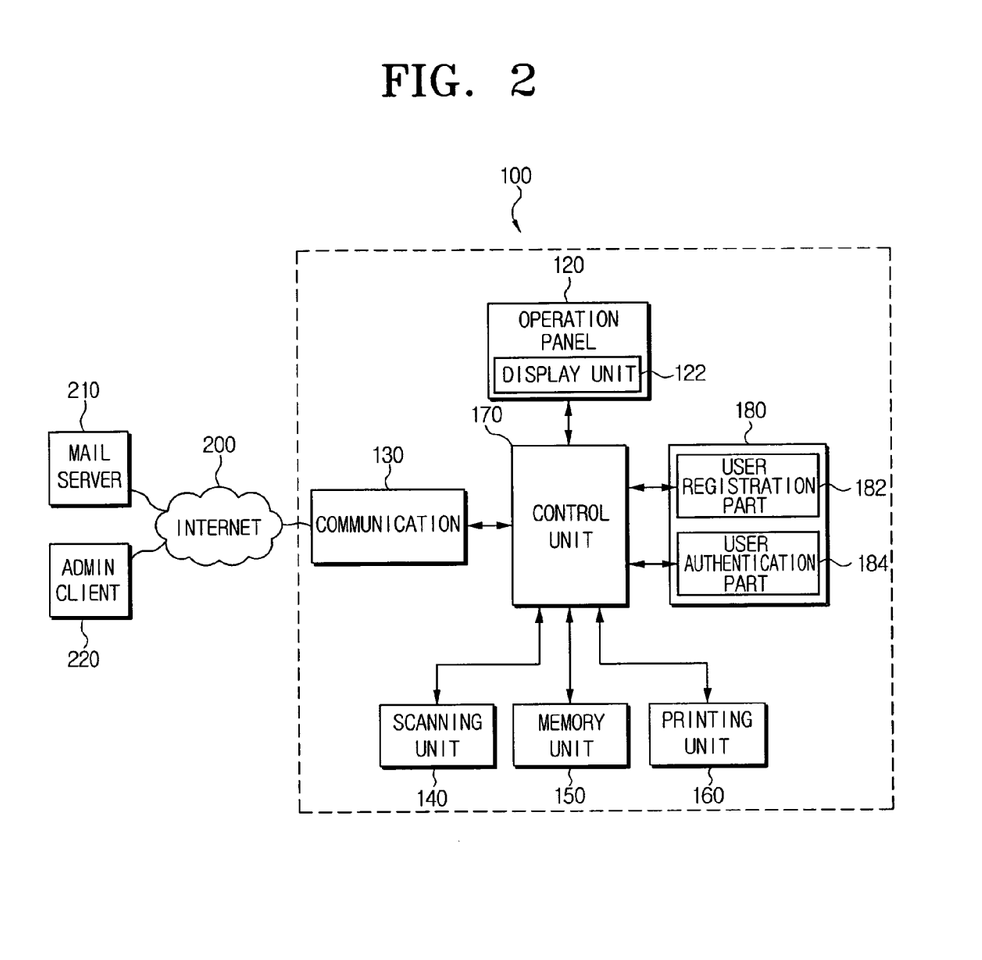
FIG. 2 is a block diagram of an MFP according to an embodiment of the present invention.

FIG. 2 is a schematic block diagram of a system comprising a multifunction apparatus (MFP) according to an embodiment of the present invention. The system comprises an MFP 100, the Internet 200, a mail server 210 and an admin client 220.

The MFP 100 preferably comprises an operation panel 120, a communication device 130, a scanning unit 140, a memory unit 150, a printing unit 160, a control unit 170 and a user management unit 180.

The operation panel 120 comprises a key matrix and a display unit 122. The key matrix comprises a plurality of numeric keys and function keys for setting functions according to menus so as to input uniform resource locators (URLs), set various functions and request registration of a user according to an embodiment of the present invention. The operation panel 120 serves as an input means for supplying the control unit 170 with key data generated by the key operation. The display unit 122 shows the functions selected through the operation panel 120 and the working state of the MFP.

The communication device 130 is connected to the mail server 210 and the admin client 220, which are the external devices, through the Internet 200 to mutually apply communication interface. The communication device 130 informs the mail server 210 of a web document by an e-mail address transmitted from the control unit 170 through the Internet 200. Also, when user registration is requested by the admin client 220 through the Internet 200, the control unit 170 controls the display of a user registration program (FIG. 4) stored in a user registration part 182. The communication device 130 may comprise a network interface card such as modem and local area network (LAN) card.

When a data transmission mode or a copy mode is set to serve as a facsimile or a copy machine, the scan unit 140, being regulated by the control unit 170, reads out a document being inserted, converts the read document to image data and transmits the image data back to the control unit 170.

The memory unit 150 comprises a read-only memory (ROM) and a random access memory (RAM). The ROM is a non-volatile memory which stores various control programs for performing various functions of the MFP 100, such as controlling firmware for converting data scanned by the scan unit 140 to digital data, and a data transmission protocol. The RAM is a volatile memory which stores various data generated during the operations of the MFP 100 and also temporarily stores the scanned data and facsimile data received from the external devices through the communication device 130.

The printing unit 160 connects with the Internet 200 through the communication device 130 to read and output a web document from corresponding sites or output a document designated by the control unit 170.

The user management unit 180 comprises the user registration part 182 and a user authentication part 184. A non-volatile memory may be used for the user management unit 180. The user registration part 182 registers users of the MFP 100 and also registers users' rights to use the respective functions of the MFP 100 according to functions permitted to be used by the registered users. To this end, the user registration part 182 comprises an MFP user registration program. Referring to FIG. 4, an exemplary graphical user interface 400 of the MFP user registration program is preferably configured to input a user's identification (ID) and a password and check functions to be allowed for use according to the requests of the registered users. Preferably, the user registration program has a map structure for easy registration by general users. The password is used for the user authentication when use of the MFP 100 is demanded by a user. By checking only specific functions, the access to any function of the MFP 100 of even an authenticated user can be restricted to the checked specific functions. In the exemplary graphical user interface 400 shown in FIG. 4, at least one of print, scan, scan-to-e-mail, facsimile (FAX) and copy functions can be checked to be allowed for use according to the users. Registration of the users through the MFP user registration program can be achieved by control of the control unit 170 through the communication device 130 when user registration is requested from the admin client 220 through the Internet 200.

When the MPF 100 or the admin client 220 requests use of the MFP 100, the user authentication part 184 presents a user authentication program through the display unit 122 for a user to input the user ID and password using the operation panel 120. The user authentication program interface (not shown) may have the same configuration as the user registration program graphical user interface 400, or may be configured to input only the user ID and the password. When the input user ID or the password is wrong, the control unit 170 controls to present an error message through the display unit 122. When the user ID and the password are correctly input, the control unit 170 authenticates the user's identity and, if the user requests to use certain functions such as a copy and facsimile function, checks whether the user is permitted to use the requested functions. When the user is not permitted to use the requested functions, the control unit 170 sends a signal to present an error message through the display unit 122. The error message may include an audible signal as well as a visual signal. When the requested functions are permitted to be used by the user, on the other hand, the control unit 170 controls the MFP 100 to perform the requested functions.

The user management unit 180 may be implemented by the memory unit 150 built into the general MFP 100, instead of the non-volatile memory as used in this embodiment.

The control unit 170 regulates the overall operations of the MFP 100 according to the control programs stored in the memory unit 150. The control unit 170 operates the MFP 100 by key signals of the operation panel 120 in one of a printing mode, a scanning mode, a facsimile mode, a copy mode and an e-mail transmission mode. Additionally, according to an embodiment of the present invention, the control unit 170 enables the user registration and user authentication through the admin client 220 or the MFP 100. Preferably, during mode conversion, which comprises switching between the various modes of the MFP 100, by the authenticated user, the control unit 170 may enable the mode conversion only among the permitted functions.

The mail server 210 comprises a predetermined application program and hardware for transmitting e-mails received from the control unit 170 to respective addresses through the communication device 130.

The admin client 220, as a network program, may comprise a general application or a web-page for registering the user to the MFP 100. It is preferable that the user registration can be achieved only through the admin client 220.

Hereinbelow, a method for restricting the use of the MFP 100 will be described according to another embodiment of the present invention.

Figure 3:
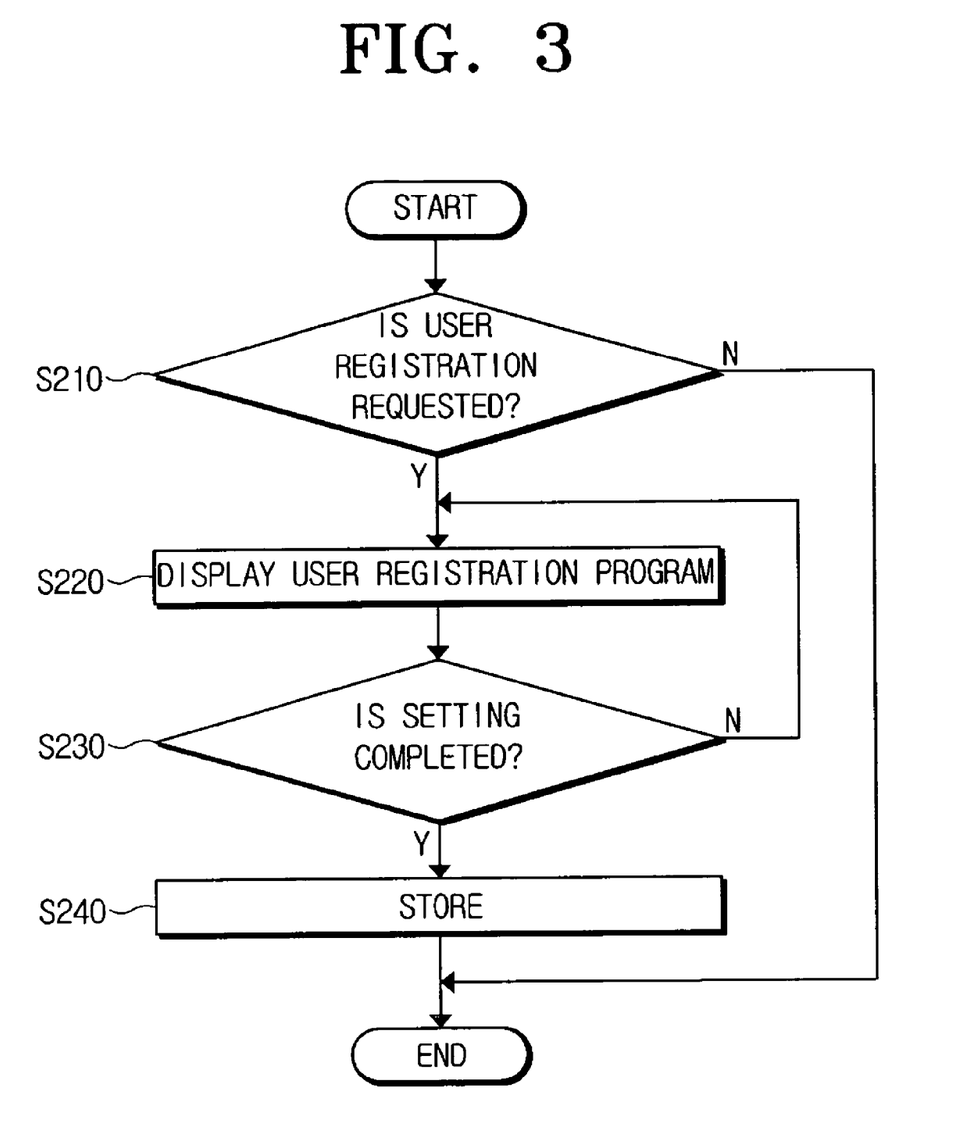
FIG. 3 is a flowchart for explaining processes of registering a user according to an embodiment of the present invention.

Processes of registering the user will now be described with reference to a flowchart of FIG. 3. The control unit 170 determines whether the user registration is requested through the operation panel 120 or the admin client 220 (S210). When the user registration is requested in step S210, the control unit 170 presents the MFP user registration program (FIG. 4) through the display unit 122 (S220). After the user ID, the password and the permitted functions are set, according to the user's selections through the MFP user registration program displayed, in step S230, the control unit 170 stores the MFP user registration program registered with user ID, the password and the right to use the respective functions in the user registration part 182, thereby completing the user registration process (S240).

Figure 5:
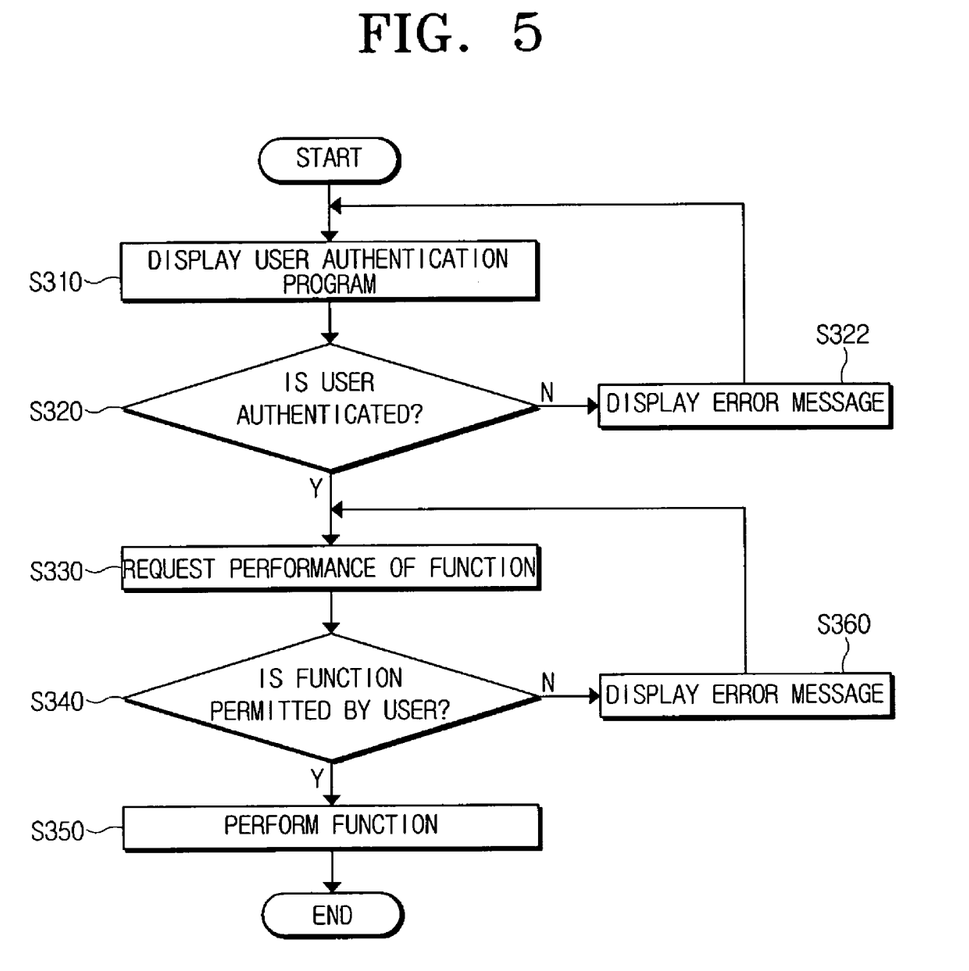
FIG. 5 is a flowchart of an exemplary process for authenticating a user according to an embodiment of the present invention.

Hereinbelow, the process of user authentication, after the user registration is completed, will be described with reference to the flowchart of FIG. 5. When use of the MFP 100 is requested by a certain user through the operation panel 120 or the communication device 130, the control unit 170 reads out from the user authentication part 184 and displays through the display unit 122 the user authentication program interface (S310). Here, the user authentication program may have the same configuration as the MFP user registration program (FIG. 4) or be configured to input only the user ID and the password.

After the user ID and the password are input through the operation panel 120, the control unit 170 determines whether the input user ID and the password corresponding with those registered in the user registration part 182, thereby performing the user authentication (S320). When the user is not authenticated in step S320, the control unit 170 presents an error message (S322). When the user is authenticated, certain functions are requested to be used (S330). The error message may notify that the user is not authenticated. The control unit 170 checks whether the user has the right to use the respective functions based on the user's registration in the user registration part 182 to determine whether use of the requested function is permitted to be used by the user (S340). If the use of the requested function is permitted to be used by the user, the control unit 170 controls the performance of the requested function (S350) and if not, presents the error message and repeats the step S330 (S360). Here, the error message may notify the user that the requested function is not permitted to be used by the requesting user, so that only the permitted functions can be performed.

Figure 6:
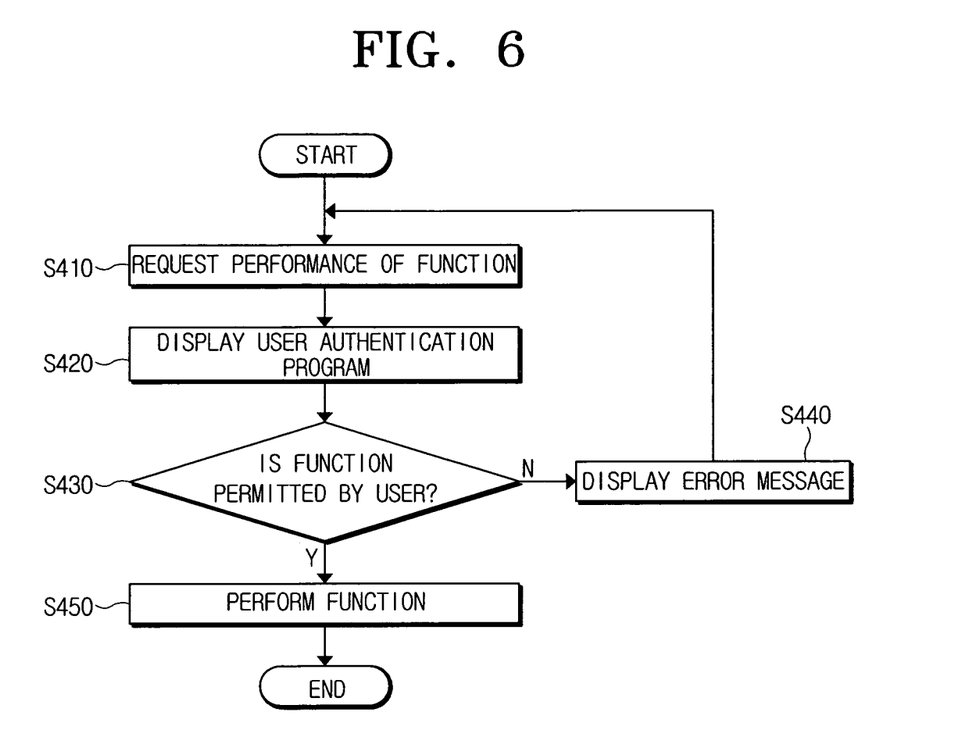
FIG. 6 is a flowchart for explaining another exemplary process of authenticating a user according to an embodiment of the present invention.

According to this embodiment, after the user authentication, the right to use a function is checked according to the user's registration. However, the right to use a function can be checked when the user first desires to use certain functions of the MFP 100 by inputting the user ID and the password. More specifically, as shown in FIG. 6, when performance of certain functions of the MFP 100 is requested (S410), the control unit 170 presents the user authentication program to be input with the user ID and the password (S420). Upon input of the user ID and the password, the control unit 170 determines whether the requested functions are permitted to the user of the input user ID and the password (S430). If the user is authenticated and permitted to use the functions, the control unit 170 controls the MFP 100 to perform the requested functions (S450). If the user is not permitted to use the functions as a result of the determination made in step 430, the control unit 170 presents the error message through the display unit 122 and repeats step S410.

Although, both the user ID and the password are required for user authentication in this embodiment of the present invention, the user authentication may be achieved simply by inputting one of either the user ID or password.

As can be appreciated from the above description, by restricting the use of the respective functions of the MFP 100 according to a user's registration, the MFP 100 can be more efficiently managed.

By the MFP 100 and the method for controlling the same according to embodiments of the present invention, unauthorized information disclosure through the MFP 100 and waste of consumables by unrestricted use can be prevented.

Figure 7:
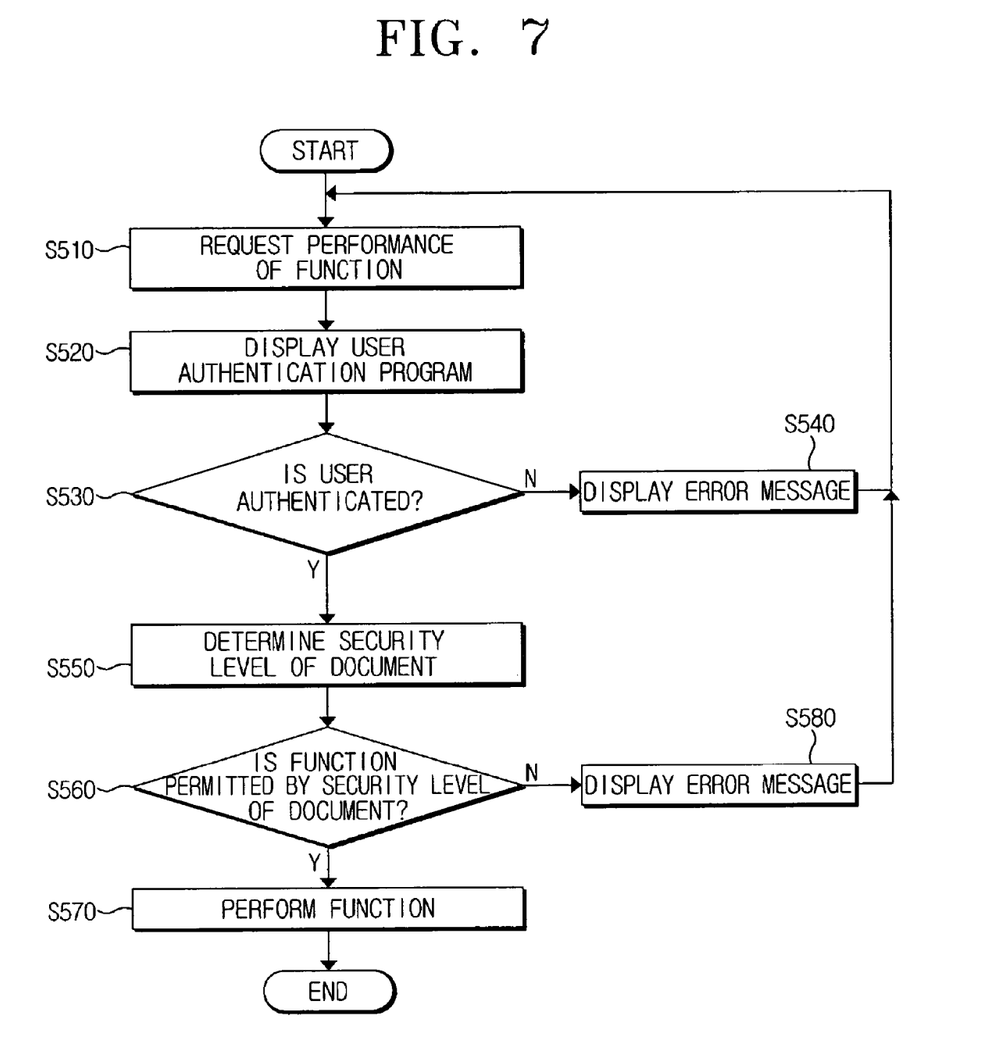
FIG. 7 is a flowchart for explaining still another process of authenticating a user according to security levels of a document.

FIG. 7 is a flowchart for explaining still another process of authenticating a user according to security levels of a document.

According to this, a certain security level such as top secret, confidential, and normal, is assigned to the document so that the functions of the MFP can be accessed according to the security level of the document and the right to use of the respective functions of the MFP.

For example, all the functions of the MFP are restricted for use when the top secret level is assigned to the document, only general copy is enabled when the confidential level is assigned to the document, and all the functions are accessible when the normal level is assigned to the document.

As shown in FIG. 7, when performance of certain functions of the MFP 100 is requested (S510), the control unit 170 shows user authentication program interface to be input with the user ID and the password (S520). Upon input of the user ID and the password, the control unit 170 determines whether the requested functions are permitted to the user of the input user ID and the password (S530).

When the user is not permitted to use the functions as a result of the step S530, the control unit 170 presents the error message through the display unit 122 (S540) and repeats step S510.

When the user is permitted to use the functions as a result of the step S530, the control unit 170 determines the security level of the corresponding document (S550).

Therefore, the control unit detects an invisible watermark based on data copied from the corresponding document, thereby reading out the security levels such as top secret, confidential, and default. Since such processes are generally performed through scanning or copying, detailed description thereof will be omitted herein.

According to the security level of the document, read in step S550, the control unit 170 determines whether the authenticated function is permitted by the security level of the corresponding document (S560).

Step S560 is required because even the authenticated user may be restricted to the permitted functions such as copying, facsimileing, and scanning, according to the security levels.

When use of the function permitted to using by user in the above step is not permitted by the security level of the document, the control unit 170 may present the error message notifying unavailableness of the function so as to call the user's attention (S580).

When the permitted function is also permitted by the security level of the document, the control unit 170 performs the corresponding function and ends the operation (S570).

As described above, according to the MFP and a controlling method thereof according to an embodiment of the present invention, information can be prevented from being disclosed unintentionally through the MFP by restricting use of the respective functions of the MFP based on the particular user and the security level assigned to the document. Also, waste of consumables by unrestricted use can be prevented.

While the invention has been shown and described with reference to certain embodiments thereof, it will be understood by those skilled in the art that various changes and modifications in form and details may be made therein without departing from the spirit and scope of the invention as defined by the appended claims.

What is claimed is:

1. An image forming apparatus capable of executing a plurality of non-combined functions including a scanning operation, a printing operation and a plurality of combined functions including a copying operation, a scan-to-fax operation, a scan-to-Email operation, the image forming apparatus comprising:
an operational panel;
a communication unit;
a scanning unit to perform the scanning operation;
a printing unit to perform the printing operation;
a memory unit to store a plurality of user registration information corresponding to a plurality of users, each user registration information including user identification, user password, scanning permission information indicating whether or not an execution of the non-combined scanning operation of the image forming apparatus is permitted, printing permission information indicating whether or not an execution of the non-combined printing operation of the image forming apparatus is permitted, copying permission information indicating whether or not an execution of the copying operation of the image forming apparatus is permitted, and scan-to-fax permission information indicating whether or not an execution of the scan-to-fax operation of the image forming apparatus is permitted; and
a control unit operable to authenticate user identification and user password, prior to executing a requested operation, based on the user registration information stored in the memory unit;
wherein if the requested operation is the non-combined scanning operation, the control unit checks whether the authenticated user is permitted to execute the requested printing operation based on the printing permission information corresponding to the authenticated user and prohibits execution of the requested printing operation if the printing permission information indicates that an execution of the non-combined scanning operation is not permitted for the authenticated user;
wherein if the requested operation is the non-combined printing operation, the control unit checks whether the authenticated user is permitted to execute the requested printing operation based on the printing permission information corresponding to the authenticated user and prohibits execution of the requested printing operation if the printing permission information indicates that an execution of the non-combined printing operation is not permitted for the authenticated user;
wherein if the requested operation is the copying operation, the control unit checks whether the authenticated user is permitted to execute the requested copying operation based on the copying permission information corresponding to the authenticated user and prohibits execution of the requested copying operation if the copying permission information indicates that an execution of the copying operation is not permitted for the authenticated user; and
wherein if the requested operation is the scan-to-fax operation, the control unit checks whether the authenticated user is permitted to execute the requested scan-to-fax operation based on the scan-to-fax permission information corresponding to the authenticated user and prohibits execution of the requested scan-to-fax operation if the scan-to-fax permission information indicates that an execution of the scan-to-fax operation is not permitted for the authenticated user.

2. The image forming apparatus of claim 1, wherein each of plurality of user registration information stored by the memory includes user identification information, user password information, first information indicating whether an execution of scanning operation of the image forming apparatus is permitted, second information indicating whether an execution of printing operation of the image forming apparatus is permitted and third information indicating whether an execution of copying operation of the image forming apparatus is permitted.

3. The image forming apparatus of claim 2, wherein the control unit is adapted to authenticate a user requesting to use the image forming apparatus based on information input via the operation panel, to receive a scanning request to execute scanning operation of the image forming apparatus, to determine whether the authenticated user is permitted to perform the requested scanning operation of the image forming apparatus based on the first information of the user information, and to restrict the authenticated user to execute the requested scanning operation of the image forming apparatus if it is determined that the authenticated user is not permitted to perform the requested scanning operation;
wherein the control unit is further adapted to receive a printing request to execute printing operation of the image forming apparatus, to determine whether the authenticated user is permitted to perform the requested printing operation of the image forming apparatus based on the second information of the user information, and to restrict the authenticated user to execute the requested printing operation of the image forming apparatus if it is determined that the authenticated user is not permitted to perform the requested printing operation; and wherein the control unit is further adapted to receive a copying request from the authenticated user to execute copying operation of the image forming apparatus, to determine whether the authenticated user is permitted to perform the requested copying operation of the image forming apparatus based on the third information of the user information, and to restrict the authenticated user to execute the requested copying operation of the image forming apparatus if it is determined that the authenticated user is not permitted to perform the requested copying operation.

4. The image forming apparatus of claim 1, wherein the image forming apparatus is further capable of executing a scanning-to-e-mail function, a facsimile function and an emailing function.

5. The image forming apparatus of claim 4, wherein the user registration information includes additional information indicating whether the respective user is permitted to execute the scan-to-emailing function, the facsimile function and the e-mailing function.

6. The image forming apparatus of claim 1, wherein the operation panel is adapted to receive information relating to an address of an Internet website, and to receive from the authenticated user a request to access the Internet website, and in response, the control unit is adapted to connect with the Internet website via the communication unit and to read a web document from the website, and to control the printing unit to print the web document if the authenticated user is permitted to use a printing operation of the image forming apparatus.

7. The image forming apparatus of claim 1, wherein the plurality of user registration information, including the scanning permission information, the printing permission information and the copying permission information, stored in the memory unit are received via a dialog screen displayed on the operational panel.

8. The image forming apparatus of claim 1, wherein the scanning permission information, the printing permission information and the copying permission information are simultaneously input via the single dialog screen displayed on the operation panel.

9. An image forming apparatus capable of executing a plurality of non-combined functions including a scanning operation, a printing operation and a plurality of combined functions including a copying operation, a scan-to-fax operation, a scan-to-Email operation, the image forming apparatus comprising:

an operational panel;
a communication unit to connect with a network;
a scanning unit to perform the scanning operation;
a printing unit to perform the printing operation; and
a control unit operable to authenticate user identification and user password, prior to executing a requested operation, based on user registration information corresponding to a user, each user registration information including user identification, user password, scanning permission information indicating whether or not an execution of a non-combined scanning operation of the image forming apparatus is permitted, printing permission information indicating whether or not an execution of a non-combined printing operation of the image forming apparatus is permitted;
a copying permission information indicating whether or not an execution of copying operation of the image forming apparatus is permitted; and
a scan-to-fax permission information indicating whether or not an execution of scan-to-fax operation of the image forming apparatus is permitted;
wherein if the requested operation is a non-combined scanning operation, the control unit checks the authenticated user is permitted to execute the requested scanning operation based on the scanning permission information corresponding to the authenticated user and prohibits execution of the requested scanning operation if the scanning permission information indicates that an execution of the non-combined scanning operation is not permitted for the authenticated user;
wherein if the requested operation is a non-combined printing operation, the control unit checks whether the authenticated user is permitted to execute the requested printing operation based on the printing permission information corresponding to the authenticated user and prohibits execution of the requested printing operation if the printing permission information indicates that an execution of the non-combined printing operation is not permitted for the authenticated user;
wherein if the requested operation is a copying operation, the control unit checks whether the authenticated user is permitted to execute the requested copying operation based on the copying permission information corresponding to the authenticated user and prohibits execution of the requested copying operation if the copying permission information indicates that an execution of the copying operation is not permitted for the authenticated user; and
wherein if the requested operation is a scan-to-fax operation, the control unit checks whether the authenticated user is permitted to execute the requested scan-to-fax operation based on the scan-to-fax permission information corresponding to the authenticated user and prohibits execution of the requested scan-to-fax operation if the scan-to-fax permission information indicates that an execution of the scan-to-fax operation is not permitted for the authenticated user.

10. The image forming apparatus of claim 9, further comprising a memory unit to store a plurality of user registration information stored, each of the plurality of user registration information including user identification information, user password information, first information indicating whether an execution of scanning operation of the image forming apparatus is permitted, second information indicating whether an execution of printing operation of the image forming apparatus is permitted and third information indicating whether an execution of copying operation of the image forming apparatus is permitted.

11. The image forming apparatus of claim 10, wherein the control unit is adapted to authenticate a user requesting to use the image forming apparatus based on information input via the operation panel, to receive a scanning request to execute scanning operation of the image forming apparatus, to determine whether the authenticated user is permitted to perform the requested scanning operation of the image forming apparatus based on the first information of the user information, and to restrict the authenticated user to execute the requested scanning operation of the image forming apparatus if it is determined that the authenticated user is not permitted to perform the requested scanning operation;

wherein the control unit is further adapted to receive a printing request to execute printing operation of the image forming apparatus, to determine whether the authenticated user is permitted to perform the requested printing operation of the image forming apparatus based on the second information of the user information, and to restrict the authenticated user to execute the requested printing operation of the image forming apparatus if it is determined that the authenticated user is not permitted to perform the requested printing operation; and wherein the control unit is further adapted to receive a copying request from the authenticated user to execute copying operation of the image forming apparatus, to determine whether the authenticated user is permitted to perform the requested copying operation of the image forming apparatus based on the third information of the user information, and to restrict the authenticated user to execute the requested copying operation of the image forming apparatus if it is determined that the authenticated user is not permitted to perform the requested copying operation.

12. The image forming apparatus of claim 9, wherein the image forming apparatus is further capable of executing a scanning-to-e-mail function, a facsimile function and an emailing function.

13. The image forming apparatus of claim 12, wherein the user registration information includes additional information indicating whether the respective user is permitted to execute the scan-to-emailing function, the facsimile function and the e-mailing function.

14. The image forming apparatus of claim 9, wherein the operation panel is adapted to receive information relating to an address of an Internet website, and to receive from the authenticated user a request to access the Internet website, and in response, the control unit is adapted to connect with the Internet website via the communication unit and to read a web document from the website, and to control the printing unit to print the web document if the authenticated user is permitted to use a printing operation of the image forming apparatus.

15. The image forming apparatus of claim 9, wherein the user registration information, including the scanning permission information, the printing permission information and the copying permission information, is received from an administrator client connected via the network.

* * * * *